(12) United States Patent
Saito (10) Patent No.: US 9,417,504 B2
(45) Date of Patent: Aug. 16, 2016

(54) VARIABLE MAGNIFICATION FINDER AND IMAGING APPARATUS

(71) Applicant: FUJIFILM Corporation, Tokyo (JP)

(72) Inventor: Hiroki Saito, Saitama-ken (JP)

(73) Assignee: FUJIFILM Corporation, Tokyo (JP)

(*) Notice: Subject to any disclaimer, the term of this patent is extended or adjusted under 35 U.S.C. 154(b) by 69 days.

(21) Appl. No.: 14/291,607

(22) Filed: May 30, 2014

(65) Prior Publication Data

US 2014/0270746 A1    Sep. 18, 2014

Related U.S. Application Data

(63) Continuation of application No. PCT/JP2012/007755, filed on Dec. 4, 2012.

(30) Foreign Application Priority Data

Dec. 5, 2011   (JP) .................. 2011-265513

(51) Int. Cl.
| | |
|---|---|
| *G03B 13/06* | (2006.01) |
| *G03B 13/10* | (2006.01) |
| *H04N 5/232* | (2006.01) |
| *G02B 23/00* | (2006.01) |
| *G02B 13/00* | (2006.01) |
| *G02B 15/16* | (2006.01) |

(52) U.S. Cl.
CPC .............. *G03B 13/06* (2013.01); *G02B 13/003* (2013.01); *G02B 15/161* (2013.01); *G02B 23/145* (2013.01); *G03B 13/10* (2013.01); *H04N 5/23296* (2013.01)

(58) Field of Classification Search
CPC ...... G03B 13/06; G03B 13/10; G02B 15/161; G02B 23/145; G02B 13/003; H04N 5/23296

USPC ................................................ 396/379
See application file for complete search history.

(56) References Cited

U.S. PATENT DOCUMENTS

| | | | |
|---|---|---|---|
| 4,653,887 A | 3/1987 | Wakamiya | |
| 6,259,569 B1* | 7/2001 | Kasai | G02B 15/173 359/683 |
| 2005/0111098 A1* | 5/2005 | Nishimura | G02B 25/005 359/431 |

(Continued)

FOREIGN PATENT DOCUMENTS

| | | |
|---|---|---|
| JP | 60-166933 | 8/1985 |
| JP | 61-270721 | 12/1986 |
| JP | 11-288021 | 10/1999 |

(Continued)

OTHER PUBLICATIONS

International Search Report, PCT/JP2012/007755, Apr. 16, 2013.

*Primary Examiner* — Rochelle-Ann J Blackman
(74) *Attorney, Agent, or Firm* — Young & Thompson

(57) ABSTRACT

The magnification of the variable magnification finder is switchable, and the finder includes a positive lens group, a negative lens group, and an eyepiece lens group in this order from an object side in a high magnification state. The positive lens group is retracted from an optical path of the variable magnification finder to the outside of the optical path and the negative lens group moves toward the object side when magnification is changed from the high magnification state to a low magnification state. The following conditional formula is satisfied when the focal length of the negative lens group is fN:

−15 mm<fN<−5 mm.

13 Claims, 8 Drawing Sheets

(56) References Cited

U.S. PATENT DOCUMENTS

2012/0099206 A1* 4/2012 Kubota ................ G02B 25/001
359/645

FOREIGN PATENT DOCUMENTS

| JP | 2001-159772 | 6/2001 |
| JP | 2010-032819 | 2/2010 |

* cited by examiner

FIG.1

A LOWEST MAGNIFICATION STATE

B HIGHEST MAGNIFICATION STATE

FIG.2

EXAMPLE 1

A    LOWEST MAGNIFICATION STATE

B    HIGHEST MAGNIFICATION STATE

FIG.3

EXAMPLE 2

A LOWEST MAGNIFICATION STATE

B HIGHEST MAGNIFICATION STATE

FIG.4
EXAMPLE 3

A LOWEST MAGNIFICATION STATE

B HIGHEST MAGNIFICATION STATE

VARIABLE MAGNIFICATION FINDER AND IMAGING APPARATUS

CROSS-REFERENCE TO RELATED APPLICATIONS

This application is a Continuation of PCT International Application No. PCT/JP2012/007755 filed on Dec. 4, 2012, which claims priority under 35 U.S.C §119 (a) to Japanese Patent Application No. 2011-265513 filed on Dec. 5, 2011. Each of the above applications is hereby expressly incorporated by reference, in its entirety, into the present application.

BACKGROUND OF THE INVENTION

1. Field of the Invention

The present invention relates to a variable magnification finder and an imaging apparatus. In particular, the present invention relates to a variable magnification finder appropriately usable in a digital camera and a film camera and to an imaging apparatus with the variable magnification finder mounted thereon.

2. Description of the Related Art

Conventionally, various methods for switching the magnification of a reverse-Galilean finder, which is used in a silver halide camera and a digital camera, were proposed to cope with imaging lenses with different focal lengths. As one of the methods, a method for changing magnification by moving a lens in an objective lens group constituting the finder is known. In this method, a movement amount of the lens tends to be large. Therefore, there was a problem that the size of the finder becomes large. Hence, as methods for realizing variable magnification while suppressing an increase in the size of the finder, methods as disclosed in Japanese Unexamined Patent Publication No. 60(1985)-166933 (Patent Document 1) and Japanese Unexamined Patent Publication No. 61 (1986)-270721 (Patent Document 2) were proposed. In Patent Documents 1 and 2, a part of an objective lens group is moved in the direction of an optical axis. Further, a part or all of the remaining objective lens group is inserted into an optical path or retracted from the optical path.

SUMMARY OF THE INVENTION

Meanwhile, as a body of a digital camera became thinner in recent years, further reduction also in the thickness of a finder became needed. However, in a reverse-Galilean finder the magnification of which is switchable, even if the methods disclosed in Patent Documents 1 and 2 are used, the movement amount of a lens group that moves in the direction of an optical axis is large. Therefore, it is insufficient to satisfy the need for reduction in thickness of recent years when the degree of reduction in thickness required in recent years is considered.

In view of the foregoing circumstances, it is an object of the present invention to provide a variable magnification finder with excellent optical performance, the thickness of which is reduced to a degree as required in recent years while magnification of the finder is switchable, and to provide an imaging apparatus including the variable magnification finder.

A variable magnification finder of the present invention is a variable magnification finder, the magnification of which is switchable, the finder comprising:

a positive lens group having positive refractive power;

a negative lens group having negative refractive power; and an eyepiece lens group in this order from an object side in a high magnification state, wherein the positive lens group is retracted from an optical path of the variable magnification finder to the outside of the optical path and the negative lens group moves toward the object side during magnification change from the high magnification state to a low magnification state, and wherein the following conditional formula (1) is satisfied when the focal length of the negative lens group is fN:

$$-15 \text{ mm} < fN < -5 \text{ mm} \quad (1).$$

In the variable magnification finder of the present invention, it is desirable that the following conditional formula (1') is satisfied instead of conditional formula (1):

$$-12 \text{ mm} < fN < -7 \text{ mm} \quad (1').$$

In the variable magnification finder of the present invention, it is desirable that the negative lens group substantially consists of two negative lenses.

In the variable magnification finder of the present invention, it is desirable that the negative lens group includes at least one aspherical surface.

In the variable magnification finder of the present invention, it is desirable that the following conditional formula (2) is satisfied when the focal length of the positive lens group is fP, and it is more desirable that the following conditional formula (2'):

$$20 \text{ mm} < fP < 60 \text{ mm} \quad (2); \text{ and}$$

$$30 \text{ mm} < fP < 50 \text{ mm} \quad (2')$$

In the variable magnification finder of the present invention, an optical path combination member for making a display on a display member arranged outside the optical path and a finder image observable by superimposing them one on the other may be arranged in the optical path between the negative lens group and the eyepiece lens group.

Here, each of the "positive lens group", the "negative lens group" and the "eyepiece lens group" is not limited to a lens group consisting of plural lenses, and they may include a lens group consisting of a lens.

Here, a positive sign and a negative sign about the refractive power of the lenses and the lens groups are considered in a paraxial region when an aspherical surface is included.

The expression "the negative lens group substantially consists of . . . " means that the negative lens group may include lenses substantially without any power, optical elements other than lenses, such as a visual field frame, an aperture and a cover glass, a lens flange, a lens barrel or the like.

In the conditional formulas (1), (1'), (2) and (2'), "mm" represents millimeter, as the unit of length.

The imaging apparatus of the present invention includes the variable magnification finder of the present invention.

According to the present invention, a part of lens groups in a system is retracted from an optical path of the system to the outside of the optical path and a part of the other lens groups in the system is moved in the direction of an optical axis during magnification change from a high magnification state to a low magnification state. Further, the focal length of the lens group that moves in the direction of the optical axis is set to satisfy conditional formula (1). Therefore, it is possible to reduce the thickness of the variable magnification finder to a degree as needed in recent years while magnification is switchable. It is possible to provide a variable magnification finder with excellent optical performance and an imaging apparatus including the variable magnification finder.

DESCRIPTION OF THE PREFERRED EMBODIMENTS

Figure 1:
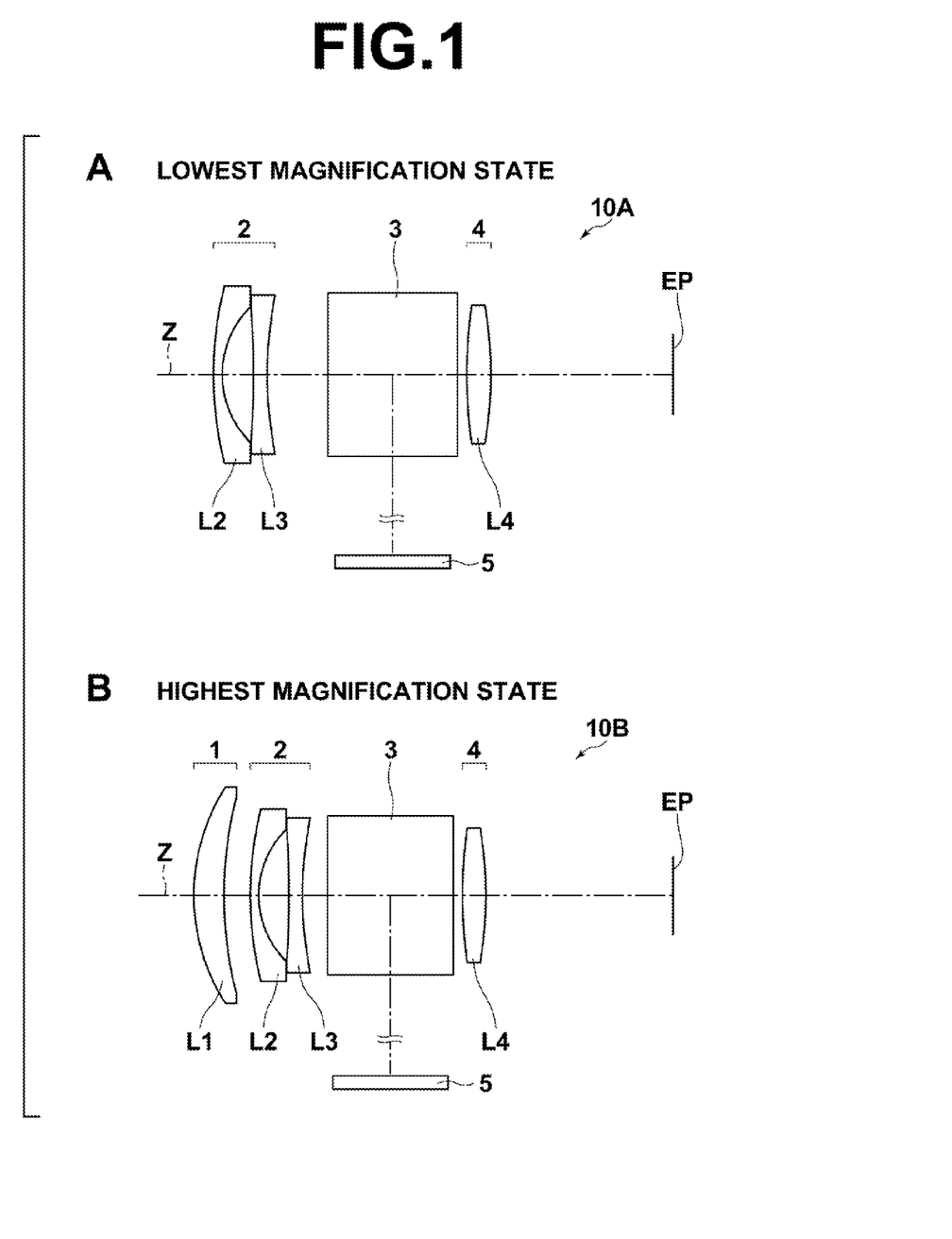
FIG. 1 is a cross section illustrating the structure of a variable magnification finder according to an embodiment of the present invention, and FIG. 1, Section A and FIG. 1, Section B illustrate a lowest magnification state and a highest magnification state, respectively.

Hereinafter, embodiments of the present invention will be described in detail with reference to drawings. FIG. 1, Section A and FIG. 1, Section B illustrate the structure of a variable magnification finder according to an embodiment of the present invention. This variable magnification finder is a reverse-Galilean finder the magnification of which is switchable. FIG. 1, Section A and FIG. 1, Section B illustrate the structure of the variable magnification finder in a cross section including optical axis Z in a lowest magnification state and in a highest magnification state, respectively. The example illustrated in FIG. 1, Section A and FIG. 1, Section B corresponds to the structure of Example 1, which will be described later. In FIG. 1, Section A and FIG. 1, Section B, the left side of the diagram is illustrated as the object side, and a right-side end of the diagram is illustrated as eye point EP.

As illustrated in FIG. 1, Section A, a variable magnification finder 10A is structured in such a manner to include a negative lens group 2 having negative refractive power, an optical path combination member 3 and an eyepiece lens group 4 in this order from an object side in a low magnification state. In the example illustrated in FIG. 1, Section A, the negative lens group 2 consists of two negative lenses L2, L3, and the eyepiece lens group 4 consists of one positive lens L4. In the low magnification state, the negative lens group 2 functions as an objective lens group.

The optical path combination member 3 is not a composition element always necessary for the variable magnification finder of the present invention. The optical path combination member 3 is provided to make a display on a display member 5 arranged outside the optical path between the negative lens group 2 and the eyepiece lens group 4 and a finder image observable by superimposing them one on the other. The finder image is formed by an objective lens group and the eyepiece lens group 4. In this manner, the finder image and the display outside the optical path are superimposed one on the other by using the optical path combination member 3. Therefore, it is possible to make a user who is looking through a finder recognize necessary information during photography by displaying the information on the display member 5. The display member 5 may be, for example, a visual field frame, a liquid crystal display device, or the like.

Here, a half prism in which a semi-transparent film (not illustrated) is provided is used as the optical path combination member 3. The semi-transparent film separates light that has perpendicularly entered an entrance surface of the half prism into transmission light and reflection light. However, the optical path combination member 3 is not necessarily limited to the half prism. The optical path combination member should have a function for combining optical paths to superimpose a finder image and a display outside the optical path one on the other. For example, the optical path combination member may be a half mirror or the like.

In FIG. 1, Section A and FIG. 1, Section B, a part of the optical path from the optical path combination member 3 to the display member 5 is not illustrated. An optical member, such as a lens and a filter, may be arranged in the optical path from the optical path combination member 3 to the display member 5.

In the embodiment of the present invention, while magnification is changed from a low magnification state to a high magnification state, the negative lens group 2 moves toward the image side, and the positive lens group 1 having positive refractive power is inserted to the optical path on the object side of the negative lens group 2. Therefore, as illustrated in FIG. 1, Section B, a variable magnification finder 10B is structured in such a manner to include the positive lens group 1, the negative lens group 2, the optical path combination member 3 and the eyepiece lens group 4 in this order from the object side in the high magnification state. In the example illustrated in FIG. 1, Section B, the positive lens group 1 consists of one positive lens L1. In the high magnification state, a combined optical system of the positive lens group 1 and the negative lens group 2 functions as an objective lens group.

In contrast, when magnification is changed from a high magnification state to a low magnification state, the positive lens group 1 is retracted from the optical path to the outside of the optical path, and the negative lens group 2 moves toward the object side. When the low magnification state and the high magnification state are switched, as described above, it is possible to switch magnification while suppressing a length in the optical axis direction necessary to arrange each lens group so that the length is short in the entire variable magnification range, and that is advantageous to reduction of the thickness of the finder.

Further, in the embodiment of the present invention, the finder is structured in such a manner to satisfy the following conditional formula (1) to further reduce the thickness of the finder by suppressing the movement amount of the negative lens group 2, and to achieve excellent optical performance:

$$-15 \text{ mm} < fN < -5 \text{ mm} \tag{1}$$

Here, fN is the focal length of the negative lens group 2.

If the value is lower than the lower limit of conditional formula (1), the refractive power of the negative lens group 2 is insufficient. Therefore, the movement amount in switching magnification increases, and it becomes difficult to reduce the thickness of the finder. If the value exceeds the upper limit of conditional formula (1), the refractive power of the negative lens group 2 becomes excessive, and it becomes difficult to excellently correct aberrations.

Therefore, it is more desirable that the following conditional formula (1') is satisfied to further reduce the thickness of the finder, and to more excellently correct aberrations:

$$-12 \text{ mm} < fN < -7 \text{ mm} \tag{1'}$$

Further, it is desirable that the negative lens group 2 substantially consists of two negative lenses. If the negative lens group 2 consists of one negative lens, it becomes difficult to excellently correct astigmatism and distortion. It is desirable that the negative lens group 2 includes at least two negative lenses to excellently correct astigmatism and distortion while having negative refractive power satisfying conditional formula (1). Further, it is desirable that the number of lenses is smaller to reduce the thickness of the finder. Therefore, it is desirable that the negative lens group 2 consists of two negative lenses.

Further, it is desirable that the negative lens group 2 includes at least one aspherical surface. In such a case, it is possible to excellently correct astigmatism and distortion, which tend to be generated in a low magnification state. In the example illustrated in FIG. 1, Section A and FIG. 1, Section B, an eye-point-side surface of lens L3 is an aspherical surface.

It is desirable that the positive lens group 1 satisfies the following conditional formula (2) when the focal length of the positive lens group 1 is fP:

$$20 \text{ mm} < fP < 60 \text{ mm} \tag{2}$$

If the value is lower than the lower limit of conditional formula (2), the refractive power of the positive lens group 1 becomes excessive, and it becomes difficult to excellently correct aberrations. If the value exceeds the upper limit of conditional formula (2), the refractive power of the positive lens group 1 becomes insufficient, and it is impossible to obtain sufficient magnification in the high magnification state.

Therefore, it is desirable that the following conditional formula (2') is satisfied to more excellently correct aberrations, and to obtain more appropriate magnification:

$$30 \text{ mm} < fP < 50 \text{ mm} \tag{2'}$$

In the example illustrated in FIG. 1, Section A and FIG. 1, Section B, the positive lens group 1 consists of a positive meniscus lens with a convex surface facing the object side. Further, the negative lens group 2 consists of a negative meniscus lens with a convex surface facing the object side and a biconcave lens in this order from the object side. Further, the eyepiece lens group 4 consists of a biconvex lens. However, the shapes of lenses and the number of lenses constituting each lens group of the present invention are not necessarily limited to the aforementioned examples.

Further, in FIG. 1, Section A and FIG. 1, Section B, the optical path from the positive lens group 1 or the negative lens group 2 to eye point EP is a straight line. However, the optical path is not limited to this, and the optical may be bent.

Figure 8:
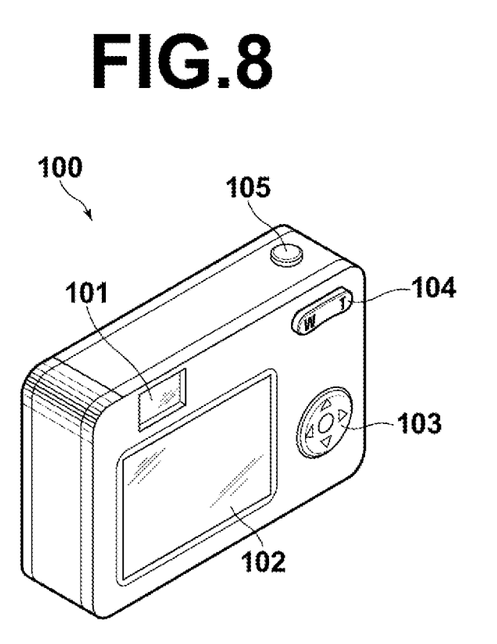
FIG. 8 is a perspective view of an imaging apparatus according to an embodiment of the present invention, which is viewed from its back side.

Next, an embodiment of an imaging apparatus according to the present invention will be described. FIG. 8 is a perspective view of a digital camera 100 according to an embodiment of the imaging apparatus of the present invention, which is viewed from its back side. The digital camera 100 includes a variable magnification finder 101 according to an embodiment of the present invention at an upper part of a camera body. Further, the digital camera 100 includes a monitor 102 for displaying images and various kinds of setting screen, an operation button 103 for performing various kinds of setting, and a zoom lever 104 for magnification change on the back side of the camera body. The digital camera 100 includes a shutter button 105 on the upper surface of the camera body.

In the digital camera 100, an image of a subject is formed on an imaging surface of an imaging device (not illustrated) by an imaging lens (not illustrated) arranged on the front surface of the camera body. A user looks through the variable magnification finder 101 from the back side, and observes a finder image of the subject. The magnification of the imaging lens is changed by operating the zoom lever 104 in imaging. The magnification of the variable magnification finder 101 is also changed in such a manner to be linked with the magnification change of the imaging lens.

Next, numerical value examples of the variable magnification finder of the present invention will be described.

Example 1

Figure 2:
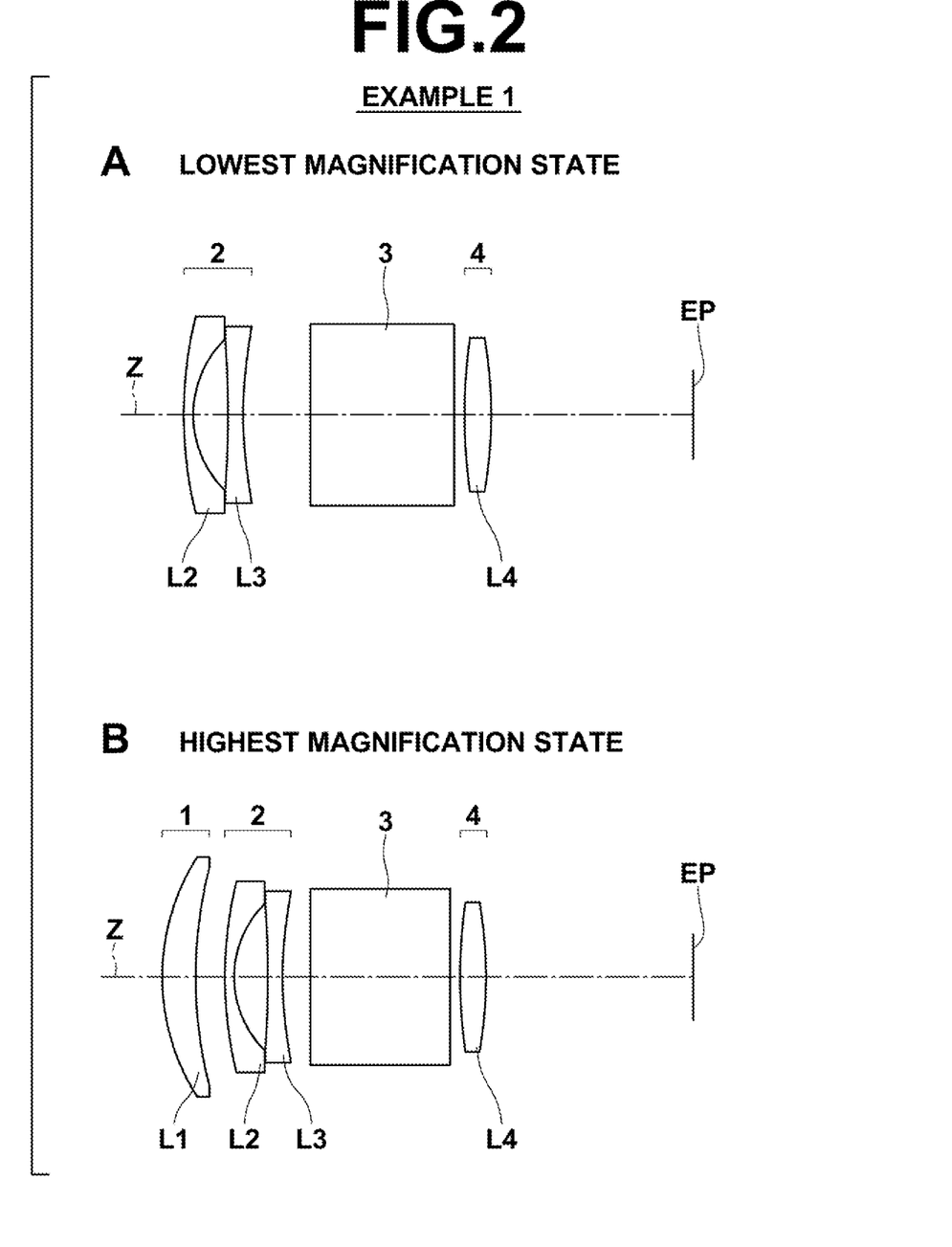
FIG. 2 is a cross section illustrating the structure of a variable magnification finder in Example 1 of the present invention, and FIG. 2, Section A and FIG. 2, Section B illustrate a lowest magnification state and a highest magnification state, respectively.

FIG. 2, Section A and FIG. 2, Section B are diagrams illustrating the structure of the variable magnification finder in Example 1 in a lowest magnification state and in a highest magnification state, respectively. In FIG. 2, Section A and FIG. 2, Section B, the left side of the diagram is illustrated as the object side, and a right-side end of the diagram is illustrated as eye point EP.

As illustrated in FIG. 2, Section A, the variable magnification finder in Example 1 consists of the negative lens group 2, the optical path combination member 3 and the eyepiece lens group 4 in this order from the object side in a low magnification state. As illustrated in FIG. 2, Section B, the variable magnification finder in Example 1 consists of the positive lens group 1, the negative lens group 2, the optical path combination member 3 and the eyepiece lens group 4 in this order from the object side in a high magnification state. The variable magnification finder in Example 1 is structured in such a manner that the positive lens group 1 is retracted from an optical path to the outside of the optical path and the negative lens group 2 moves toward the object side during magnification change from the high magnification state to the low magnification state.

The structure of each lens group of the variable magnification finder in Example 1 will be outlined. Specifically, the positive lens group 1 consists of positive-meniscus-shaped lens L1 with a convex surface facing the object side. The negative lens group 2 consists of negative-meniscus-shaped lens L2 with a convex surface facing the object side and lens L3 having a biconcave-shaped paraxial region in this order from the object side. Further, the eyepiece lens group 4 consists of biconvex-shaped lens L4. Further, an eye-point-side surface of lens L3 is an aspherical surface.

Table 1 and Table 2 show the structure of the variable magnification finder in Example 1 in detail. Table 1 and Table 2 show the structure in a lowest magnification state and in a highest magnification state, respectively. In each of the tables, (a) shows basic lens data, and (b) shows an angular magnification and an angle of field, and (c) shows aspherical surface coefficients.

When the lowest magnification state is compared with the highest magnification state, the lowest magnification state differs only in that the positive lens group 1 is not included as a composition element, and other composition elements are common. Therefore, Table 1 and Table 2 show data in such a manner that surface numbers of the common composition elements coincide with each other.

The column of Si of basic lens data in Table 1 (a) shows i-th surface number (i=3, 4, 5 . . . ) when the most object-side surface in the negative lens group 2 is the third surface and surface numbers sequentially increase toward the eye-point side. The column of Ri shows the curvature radius of the i-th surface, and the column of Di shows a surface distance between the i-th surface and the (i+1) th surface on optical axis Z. The column of Ndj shows the refractive index of a j-th optical element (j=2, 3, 4 . . . ) with respect to d-line (wavelength is 587.6 nm) when the most-object-side composition element in the negative lens group 2 is the second composition element and the value of j sequentially increases toward the eye-point side. Further, the column of vdj shows the Abbe number of the j-th composition element with respect to d-line. The sign of the curvature radius is positive when the shape of a surface is convex toward the object side, and negative when the shape of a surface is convex toward the eye-point side.

In the basic lens data of Table 1(a), mark * is attached to the surface number of an aspherical surface. The column of curvature radius of basic lens data shows the numerical value of a paraxial curvature radius for the aspherical surface. Table 1(c) shows aspherical surface coefficients of this aspherical surface. In the numerical values of the aspherical surface coefficients in Table 1(c), "E−n" (n: integer) means "×10$^{-n}$". The aspherical surface coefficients are values of coefficients KA and Am (m=4, 6, 8 and 10) in an aspherical surface equation represented by the following expression:

$$Zd = C \cdot h^2 / \{1 + (1 - KA \cdot C^2 \cdot h^2)^{1/2}\} + \Sigma Am \cdot h^m, \text{ where}$$

Zd: depth of aspherical surface (the length of a perpendicular from a point on the aspherical surface at height h to a flat plane that contacts with the vertex of the aspherical surface and is perpendicular to the optical axis), h: height (the length from the optical axis to the lens surface), C: paraxial curvature, and KA, Am: aspherical surface coefficients (m=4, 6, 8 and 10).

Table 2 is written basically in a similar manner to Table 1 except that the column of Si of basic lens data shows i-th surface number (i=1, 2, 3 . . . ) when the most object-side surface in the positive lens group 1 is the first surface and surface numbers sequentially increase toward the eye-point side, and that the column of Di shows a surface distance between this i-th surface and the (i+1)th surface on optical axis Z, and that the column of Ndj shows the refractive index of a j-th optical element (j=1, 2, 3 . . . ) with respect to d-line (wavelength is 587.6 nm) when the most-object-side composition element in the positive lens group 1 is the first composition element and the value of j sequentially increases toward the eye-point side, and that the column of vdj shows the Abbe number of this j-th composition element with respect to d-line.

In Table 1 and Table 2, degree is used as the unit of angle, and "mm" is used as the unit of length. Each of the following tables shows values rounded at predetermined digits.

TABLE 1

EXAMPLE 1 (LOWEST MAGNIFICATION STATE)

(a) BASIC LENS DATA

| Si | Ri | Di | Ndj | v dj |
|---|---|---|---|---|
| 3 | 32.6029 | 0.75 | 1.77250 | 49.60 |
| 4 | 8.4126 | 2.75 | | |
| 5 | −85.3703 | 1.20 | 1.80348 | 40.45 |
| *6 | 30.6553 | 5.33 | | |
| 7 | ∞ | 11.40 | 1.78590 | 44.20 |
| 8 | ∞ | 0.82 | | |
| 9 | 42.9042 | 2.11 | 1.78590 | 44.20 |
| 10 | −35.6838 | 16.00 | | |
| EYE POINT | ∞ | | | |

(b) ANGULAR MAGNIFICATION AND ANGLE OF FIELD

| | |
|---|---|
| ANGULAR MAGNIFICATION | 0.37 |
| ANGLE OF FIELD[°] | 75.38 |

(c) ASPHERICAL SURFACE COEFFICIENT

| SURFACE NUMBER | 6 |
|---|---|
| KA | −2.270933E+00 |
| A4 | −3.229983E−05 |
| A6 | 2.202466E−07 |
| A8 | −1.779283E−08 |
| A10 | 2.081496E−10 |

TABLE 2

EXAMPLE 1 (HIGHEST MAGNIFICATION STATE)

(a) BASIC LENS DATA

| Si | Ri | Di | Ndj | v dj |
|---|---|---|---|---|
| 1 | 18.2485 | 2.73 | 1.83481 | 42.73 |
| 2 | 36.2833 | 2.38 | | |
| 3 | 32.6029 | 0.75 | 1.77250 | 49.60 |
| 4 | 8.4126 | 2.75 | | |
| 5 | −85.3703 | 1.20 | 1.80348 | 40.45 |
| *6 | 30.6553 | 2.27 | | |
| 7 | ∞ | 11.40 | 1.78590 | 44.20 |
| 8 | ∞ | 0.82 | | |
| 9 | 42.9042 | 2.11 | 1.78590 | 44.20 |
| 10 | −35.6838 | 16.00 | | |
| EYE POINT | ∞ | | | |

(b) ANGULAR MAGNIFICATION AND ANGLE OF FIELD

| | |
|---|---|
| ANGULAR MAGNIFICATION | 0.60 |
| ANGLE OF FIELD[°] | 46.80 |

(c) ASPHERICAL SURFACE COEFFICIENT

| SURFACE NUMBER | 6 |
|---|---|
| KA | −2.270933E+00 |
| A4 | −3.229983E−05 |
| A6 | 2.202466E−07 |
| A8 | −1.779283E−08 |
| A10 | 2.081496E−10 |

Figure 5:
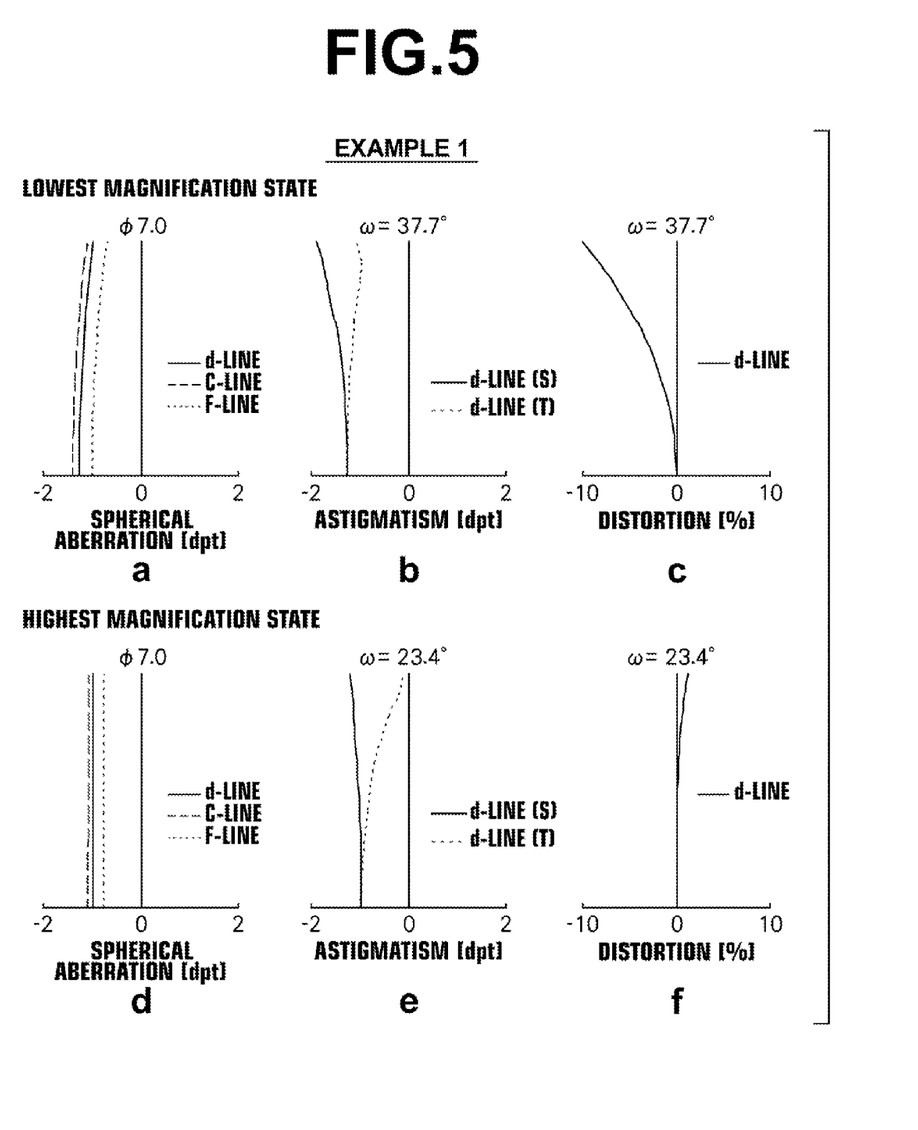
FIG. 5 is a diagram illustrating aberrations of the variable magnification finder in Example 1 of the present invention, and FIG. 5, Section a, FIG. 5, Section b and FIG. 5, Section c are diagrams illustrating a spherical aberration, astigmatism and distortion in the lowest magnification state, respectively, and FIG. 5, Section d, FIG. 5, Section e and FIG. 5, Section f are diagrams illustrating a spherical aberration, astigmatism and distortion in the highest magnification state, respectively.

FIG. 5, Section a, FIG. 5, Section b and FIG. 5, Section c are aberration diagrams illustrating a spherical aberration, astigmatism and distortion of the variable magnification finder in Example 1 in a lowest magnification state, respectively. FIG. 5, Section d, FIG. 5, Section e and FIG. 5, Section f are aberration diagrams illustrating a spherical aberration, astigmatism and distortion of the variable magnification finder in Example 1 in a highest magnification state, respectively.

Each of the aberration diagrams is based on d-line. In the diagram of a spherical aberration, aberrations for C-line (wavelength is 656.3 nm) and F-line (wavelength is 486.1 nm) are also illustrated. In the diagram of astigmatism, an aberration in a sagittal direction is indicated by a solid line, and an aberration in a tangential direction is indicated by a broken line. In the diagram of the spherical aberration, "φ7.0" written at the upper part of the vertical axis means that the diameter of an eye point is 7.0 mm. In the other aberration diagrams, "ω" means a half angle of view. In the diagram of the spherical aberration and the diagram of astigmatism, the unit of the horizontal axis is diopter. In the diagram of distortion, the unit of the horizontal axis is %.

Values corresponding to conditional formulas (1), (2) for the variable magnification finder in Example 1 will be shown later in Table 7 together with those of other Examples 2, 3.

The illustration method of diagrams, the signs in each table and their meanings, and the description method, as described for Example 1, are similar in the following Examples 2 and 3 unless otherwise mentioned. Therefore, repetition of explanation will be omitted.

Example 2

Figure 3:
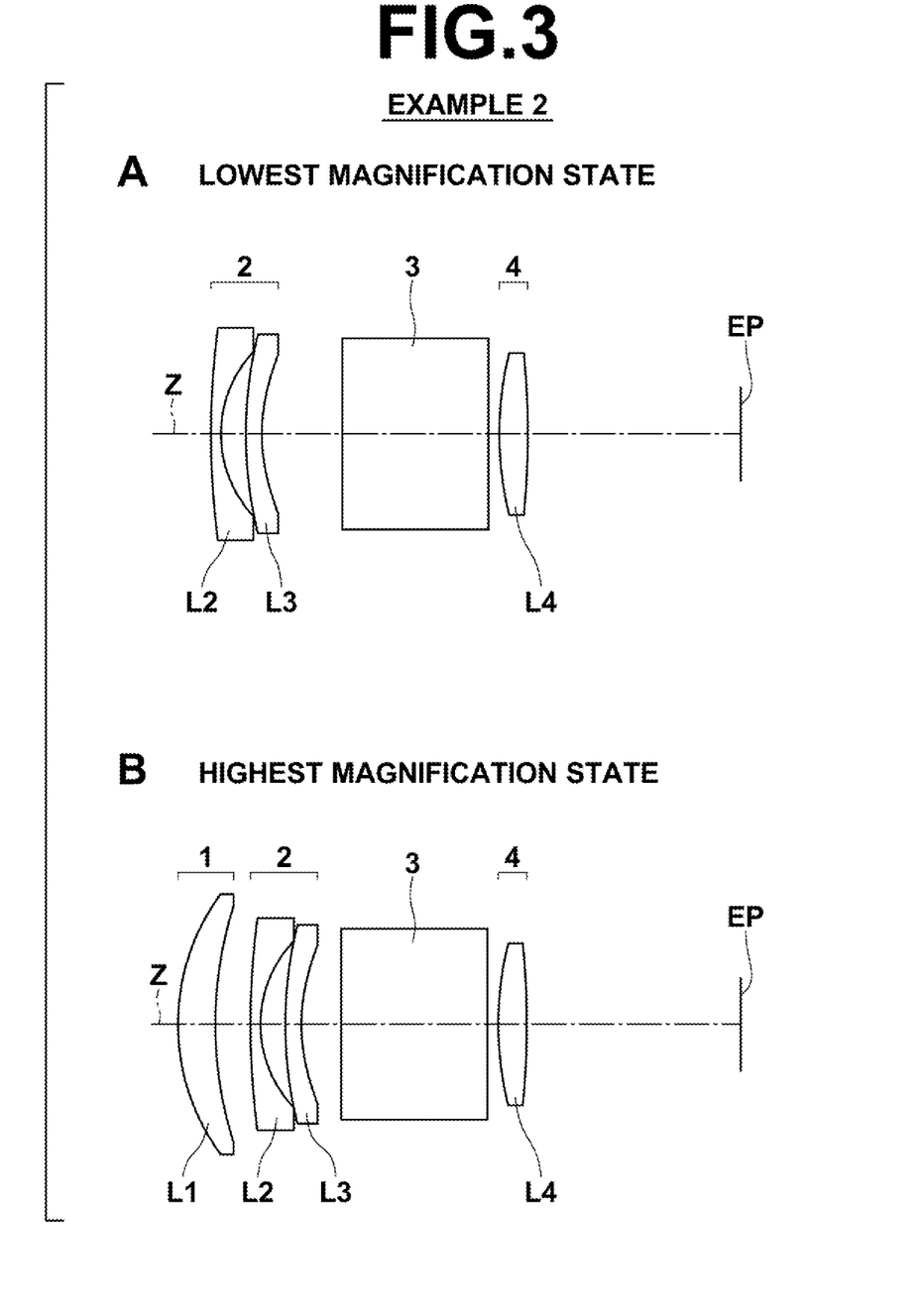
FIG. 3 is a cross section illustrating the structure of a variable magnification finder in Example 2 of the present invention, and FIG. 3, Section A and FIG. 3, Section B illustrate a lowest magnification state and a highest magnification state, respectively.

FIG. 3, Section A and FIG. 3, Section B illustrate the structure of the variable magnification finder in Example 2 at a lowest magnification state and a highest magnification state, respectively. The magnification of the variable magnification finder in Example 2 is changed in a similar manner to that of Example 1. The structure of each lens group in the variable magnification finder of Example 2 substantially differs from that of Example 1 only in that lens L3 has a negative meniscus shape with a convex surface facing the object side in its paraxial region, and other features are similar to those of Example 1.

Table 3 and Table 4 show the details of the structure of the variable magnification finder in Example 2 at a lowest magnification state and at a highest magnification state, respectively.

TABLE 3

EXAMPLE 2 (LOWEST MAGNIFICATION STATE)

(a) BASIC LENS DATA

| Si | Ri | Di | Ndj | νdj |
|---|---|---|---|---|
| 3 | 62.5766 | 0.75 | 1.78590 | 44.20 |
| 4 | 9.1253 | 1.87 | | |
| 5 | 31.6218 | 1.20 | 1.80348 | 40.45 |
| *6 | 13.5574 | 6.05 | | |
| 7 | ∞ | 11.00 | 1.78590 | 44.20 |
| 8 | ∞ | 0.82 | | |
| 9 | 25.3462 | 2.14 | 1.74400 | 44.78 |
| 10 | −62.4797 | 16.00 | | |
| EYE POINT | ∞ | | | |

(b) ANGULAR MAGNIFICATION AND ANGLE OF FIELD

| ANGULAR MAGNIFICATION | 0.38 |
|---|---|
| ANGLE OF FIELD[°] | 75.38 |

(c) ASPHERICAL SURFACE COEFFICIENT

| SURFACE NUMBER | 6 |
|---|---|
| KA | −1.986124E+00 |
| A4 | 1.806365E−05 |
| A6 | 3.725273E−07 |
| A8 | −2.307033E−08 |
| A10 | 7.903359E−11 |

TABLE 4

EXAMPLE 2 (HIGHEST MAGNIFICATION STATE)

(a) BASIC LENS DATA

| Si | Ri | Di | Ndj | νdj |
|---|---|---|---|---|
| 1 | 16.6077 | 2.81 | 1.83481 | 42.73 |
| 2 | 29.6225 | 2.64 | | |
| 3 | 62.5766 | 0.75 | 1.78590 | 44.20 |
| 4 | 9.1253 | 1.87 | | |
| 5 | 31.6218 | 1.20 | 1.80348 | 40.45 |
| *6 | 13.5574 | 3.00 | | |
| 7 | ∞ | 11.00 | 1.78590 | 44.20 |
| 8 | ∞ | 0.82 | | |
| 9 | 25.3462 | 2.14 | 1.74400 | 44.78 |
| 10 | −62.4797 | 16.00 | | |
| EYE POINT | ∞ | | | |

(b) ANGULAR MAGNIFICATION AND ANGLE OF FIELD

| ANGULAR MAGNIFICATION | 0.61 |
|---|---|
| ANGLE OF FIELD[°] | 46.80 |

(c) ASPHERICAL SURFACE COEFFICIENT

| SURFACE NUMBER | 6 |
|---|---|
| KA | −1.986124E+00 |
| A4 | 1.806365E−05 |
| A6 | 3.725273E−07 |
| A8 | −2.307033E−08 |
| A10 | 7.903359E−11 |

Figure 6:
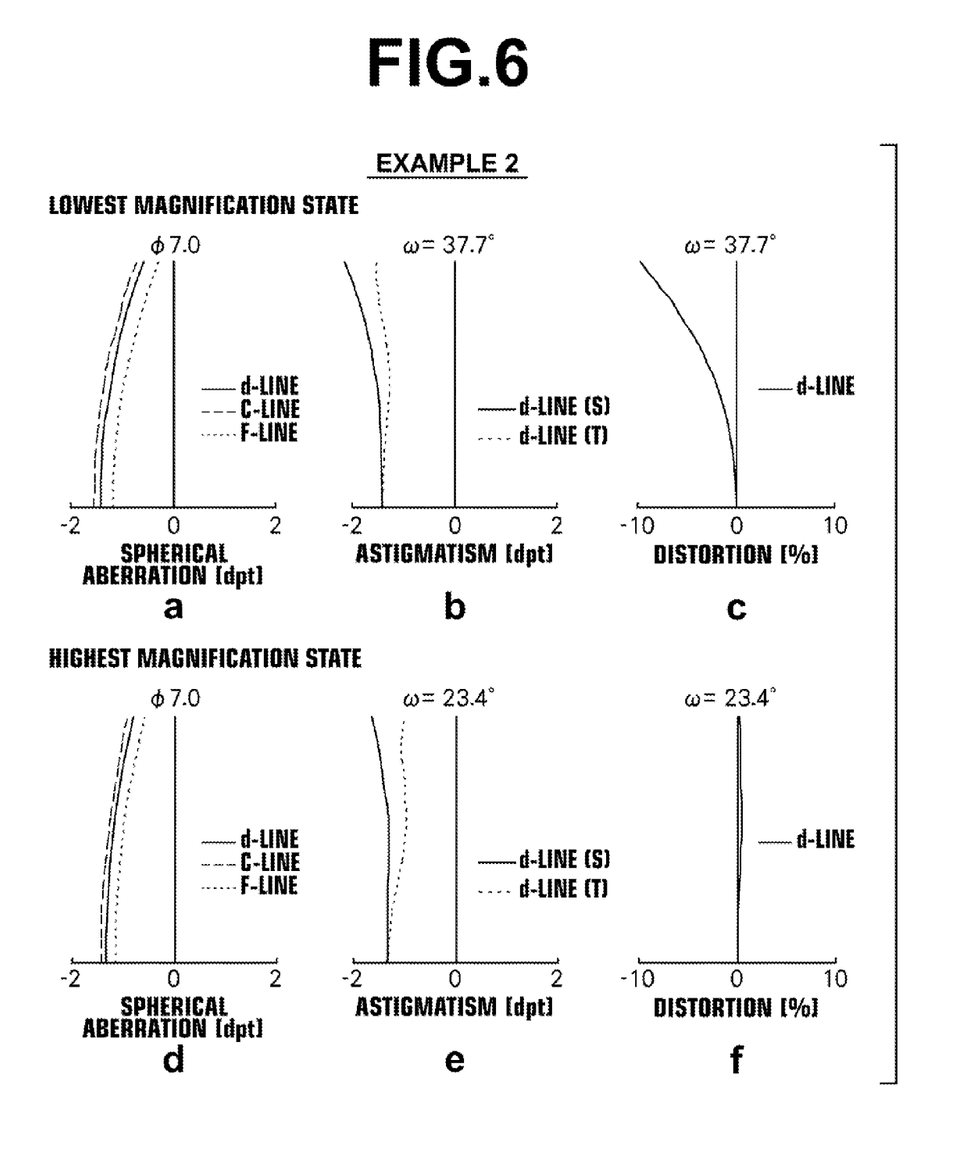
FIG. 6 is a diagram illustrating aberrations of the variable magnification finder in Example 2 of the present invention, and FIG. 6, Section a, FIG. 6, Section b and FIG. 6, Section c are diagrams illustrating a spherical aberration, astigmatism and distortion in the lowest magnification state, respectively, and FIG. 6, Section d, FIG. 6, Section e and FIG. 6, Section f are diagrams illustrating a spherical aberration, astigmatism and distortion in the highest magnification state, respectively.

FIG. 6, Section a, FIG. 6, Section b and FIG. 6, Section c are aberration diagrams illustrating a spherical aberration, astigmatism and distortion of the variable magnification finder in Example 2 in a lowest magnification state, respectively. FIG. 6, Section d, FIG. 6, Section e and FIG. 6, Section f are aberration diagrams illustrating a spherical aberration, astigmatism and distortion of the variable magnification finder in Example 2 in a highest magnification state, respectively.

Example 3

Figure 4:
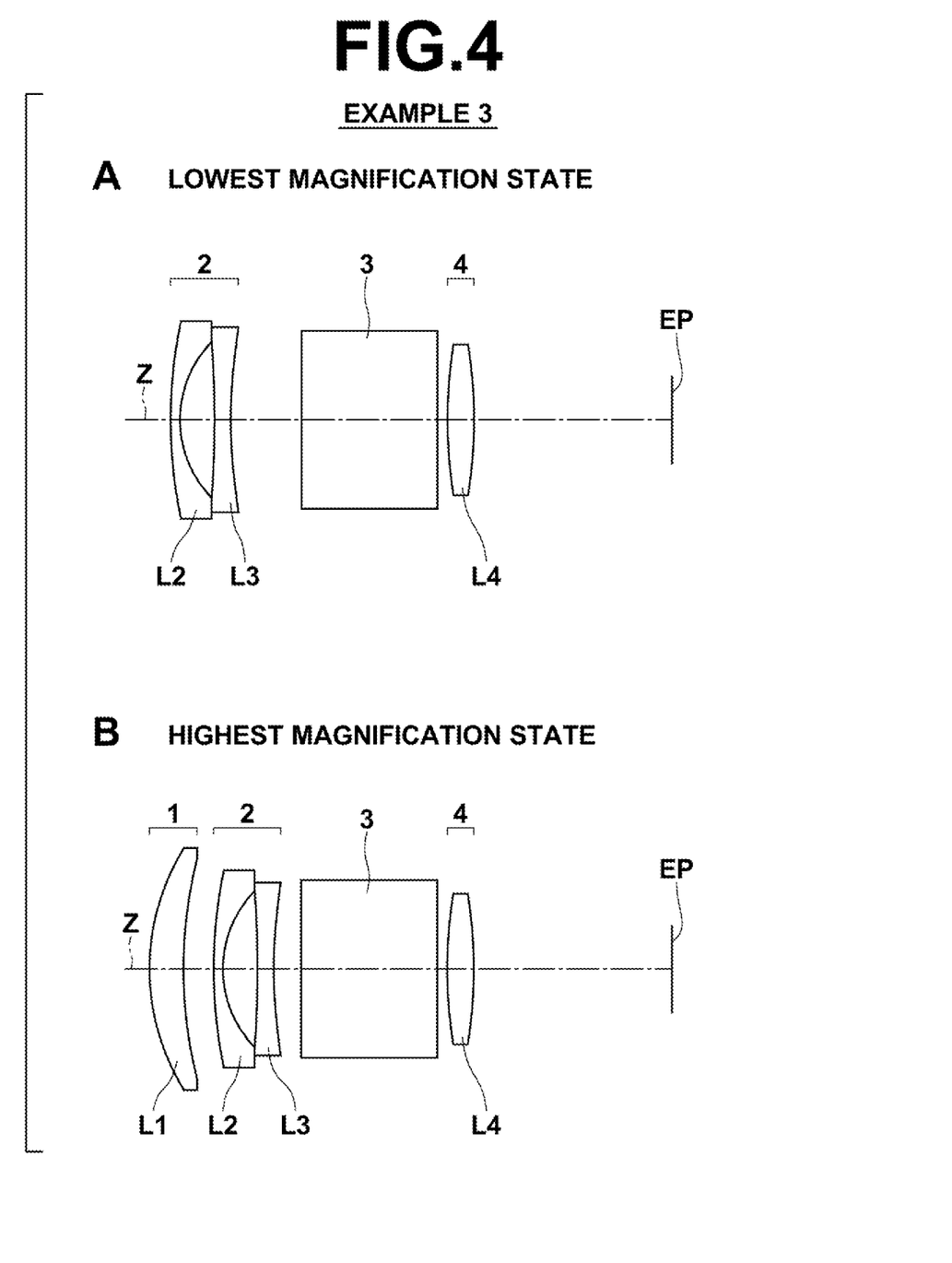
FIG. 4 is a cross section illustrating the structure of a variable magnification finder in Example 3 of the present invention, and FIG. 4, Section A and FIG. 4, Section B illustrate a lowest magnification state and a highest magnification state, respectively.

FIG. 4, Section A and FIG. 4, Section B illustrate the structure of the variable magnification finder in Example 3 at a lowest magnification state and a highest magnification state, respectively. The magnification of the variable magnification finder in Example 3 is changed in a similar manner to that of Example 1. The structure of each lens group in the variable magnification finder of Example 3 is also substantially similar to that of Example 1. Table 5 and Table 6 show the details of the structure of the variable magnification finder in Example 3 at a lowest magnification state and at a highest magnification state, respectively.

TABLE 5

EXAMPLE 3 (LOWEST MAGNIFICATION STATE)

(a) BASIC LENS DATA

| Si | Ri | Di | Ndj | νdj |
|---|---|---|---|---|
| 3 | 39.0424 | 0.75 | 1.78590 | 44.20 |
| 4 | 9.0654 | 2.79 | | |
| 5 | −88.7701 | 1.31 | 1.80348 | 40.45 |
| *6 | 36.7117 | 5.73 | | |
| 7 | ∞ | 11.00 | 1.78590 | 44.20 |
| 8 | ∞ | 0.82 | | |
| 9 | 38.5025 | 2.14 | 1.74400 | 44.78 |
| 10 | −38.4095 | 16.00 | | |
| EYE POINT | ∞ | | | |

TABLE 5-continued

EXAMPLE 3 (LOWEST MAGNIFICATION STATE)

(b) ANGULAR MAGNIFICATION AND ANGLE OF FIELD

| ANGULAR MAGNIFICATION | 0.39 |
|---|---|
| ANGLE OF FIELD[°] | 75.38 |

(c) ASPHERICAL SURFACE COEFFICIENT

| SURFACE NUMBER | 6 |
|---|---|
| KA | −2.720061E+00 |
| A4 | −5.873584E−05 |
| A6 | 1.207189E−06 |
| A8 | −2.029732E−08 |
| A10 | 6.990193E−11 |

TABLE 6

EXAMPLE 3 (HIGHEST MAGNIFICATION STATE)

(a) BASIC LENS DATA

| Si | Ri | Di | Ndj | νdj |
|---|---|---|---|---|
| 1 | 18.6275 | 2.74 | 1.83481 | 42.73 |
| 2 | 36.3486 | 2.44 | | |
| 3 | 39.0424 | 0.75 | 1.78590 | 44.20 |
| 4 | 9.0654 | 2.79 | | |
| 5 | −88.7701 | 1.31 | 1.80348 | 40.45 |
| *6 | 36.7117 | 2.22 | | |
| 7 | ∞ | 11.00 | 1.78590 | 44.20 |
| 8 | ∞ | 0.82 | | |
| 9 | 38.5025 | 2.14 | 1.74400 | 44.78 |
| 10 | −38.4095 | 16.00 | | |
| EYE POINT | ∞ | | | |

(b) ANGULAR MAGNIFICATION AND ANGLE OF FIELD

| ANGULAR MAGNIFICATION | 0.63 |
|---|---|
| ANGLE OF FIELD[°] | 46.80 |

(c) ASPHERICAL SURFACE COEFFICIENT

| SURFACE NUMBER | 6 |
|---|---|
| KA | −2.720061E+00 |
| A4 | −5.873584E−05 |
| A6 | 1.207189E−06 |
| A8 | −2.029732E−08 |
| A10 | 6.990193E−11 |

Figure 7:
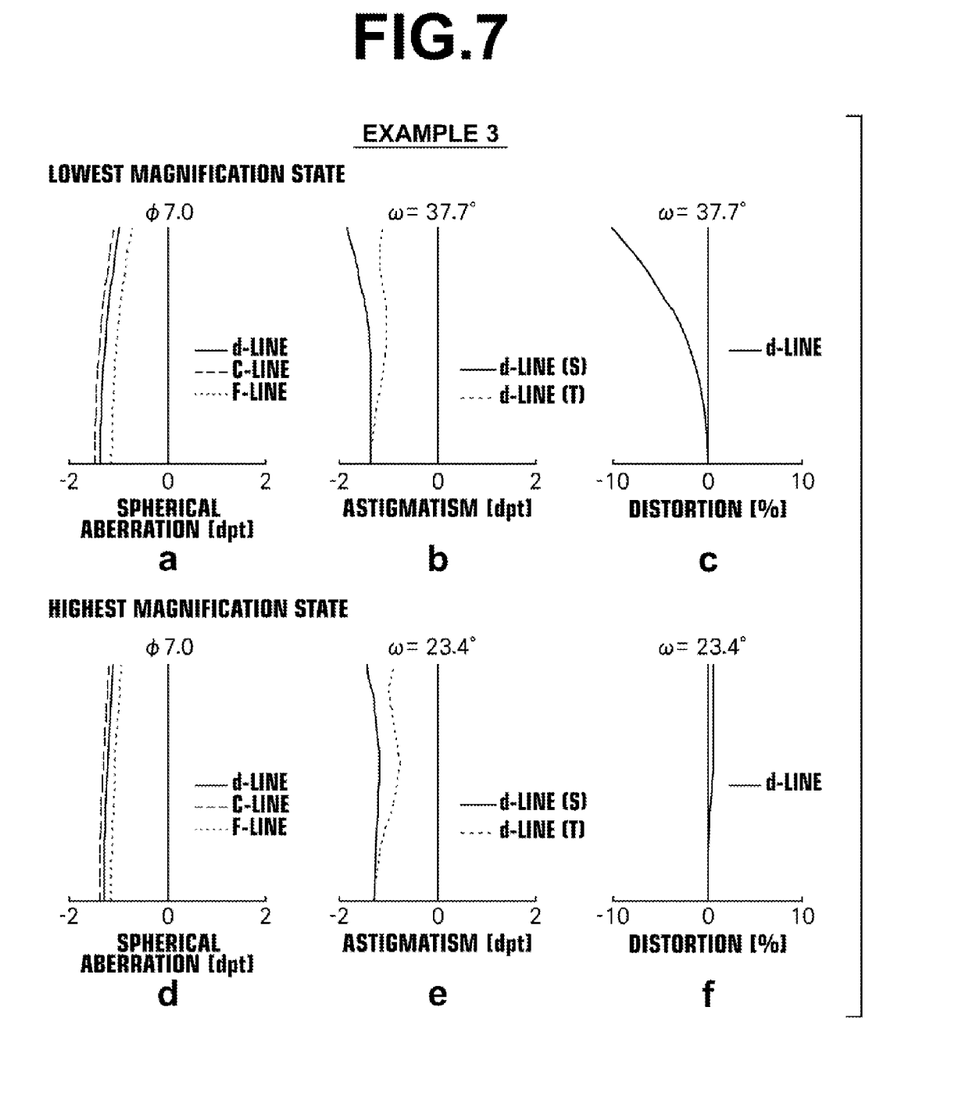
FIG. 7 is a diagram illustrating aberrations of the variable magnification finder in Example 3 of the present invention, and FIG. 7, Section a, FIG. 7, Section b and FIG. 7, Section c are diagrams illustrating a spherical aberration, astigmatism and distortion in the lowest magnification state, respectively, and FIG. 7, Section d, FIG. 7, Section e and FIG. 7, Section f are diagrams illustrating a spherical aberration, astigmatism and distortion in the highest magnification state, respectively.

FIG. 7, Section a, FIG. 7, Section b and FIG. 7, Section c are aberration diagrams illustrating a spherical aberration, astigmatism and distortion of the variable magnification finder in Example 3 in a lowest magnification state, respectively. FIG. 7, Section d, FIG. 7, Section e and FIG. 7, Section f are aberration diagrams illustrating a spherical aberration, astigmatism and distortion of the variable magnification finder in Example 3 in a highest magnification state, respectively.

Table 7 shows values corresponding to conditional formulas (1), (2) for the variable magnification finders in Examples 1 to 3. Table 7 shows values for d-line.

TABLE 7

| | EXAMPLE 1 | EXAMPLE 2 | EXAMPLE 3 |
|---|---|---|---|
| CONDITIONAL FORMULA (1) fN | −9.06 | −8.84 | −9.67 |
| CONDITIONAL FORMULA (2) fP | 41.14 | 41.23 | 42.76 |

So far, the present invention has been described by using embodiments and examples. However, the present invention is not limited to the embodiments nor the examples, and various modifications are possible. For example, values, such as the curvature radius of each lens, distances between surfaces, refractive indices, Abbe numbers and aspherical surface coefficients, are not limited to the values in the numerical value examples, but may be other values.

What is claimed is:

1. A variable magnification finder, the magnification of which is switchable, the finder comprising:
    a positive lens group having positive refractive power;
    a negative lens group having negative refractive power; and
    an eyepiece lens group in this order from an object side in a high magnification state,
    wherein the positive lens group is retracted from an optical path of the variable magnification finder to the outside of the optical path and the negative lens group moves toward the object side during magnification change from the high magnification state to a low magnification state, and
    wherein the following conditional formula (1) is satisfied when the focal length of the negative lens group is fN:

$$-15 \text{ mm} < fN < -5 \text{ mm} \qquad (1),$$ and wherein the variable magnification finder is a reverse-Galilean finder.

2. The variable magnification finder, as defined in claim 1, wherein the negative lens group substantially consists of two negative lenses.

3. The variable magnification finder, as defined in claim 1, wherein the negative lens group includes at least one aspherical surface.

4. The variable magnification finder, as defined in claim 1, wherein the following conditional formula (2) is satisfied when the focal length of the positive lens group is fP:

$$20 \text{ mm} < fP < 60 \text{ mm} \qquad (2).$$

5. The variable magnification finder, as defined in claim 1, wherein an optical path combination member for making a display on a display member arranged outside the optical path and a finder image observable by superimposing them one on the other is arranged in the optical path between the negative lens group and the eyepiece lens group.

6. The variable magnification finder, as defined in claim 1, wherein the following conditional formula (1') is satisfied:

$$-12 \text{ mm} < fN < -7 \text{ mm} \qquad (1').$$

7. The variable magnification finder, as defined in claim 1, wherein the following conditional formula (2') is satisfied when the focal length of the positive lens group is fP:

$$30 \text{ mm} < fP < 50 \text{ mm} \qquad (2').$$

8. The variable magnification finder, as defined in claim 2, wherein the negative lens group includes at least one aspherical surface.

9. The variable magnification finder, as defined in claim 2, wherein the following conditional formula (2) is satisfied when the focal length of the positive lens group is fP:

$$20 \text{ mm} < fP < 60 \text{ mm} \qquad (2).$$

10. The variable magnification finder, as defined in claim 2, wherein an optical path combination member for making a display on a display member arranged outside the optical path and a finder image observable by superimposing them one on the other is arranged in the optical path between the negative lens group and the eyepiece lens group.

11. The variable magnification finder, as defined in claim 2, wherein the following conditional formula (1') is satisfied:

$$-12\ mm < fN < -7\ mm \quad (1').$$

12. The variable magnification finder, as defined in claim 2, wherein the following conditional formula (2') is satisfied when the focal length of the positive lens group is fP:

$$30\ mm < fP < 50\ mm \quad (2').$$

13. An imaging apparatus comprising:
the variable magnification finder, as defined in claim 1.

* * * * *